J. W. TRIPP.
RULE.
APPLICATION FILED SEPT. 2, 1916.

1,223,644.

Patented Apr. 24, 1917.

Inventor
Jacob W. Tripp
By his Attorney
Fred A. Tasker.

UNITED STATES PATENT OFFICE.

JACOB W. TRIPP, OF NEW YORK, N. Y.

RULE.

1,223,644.

Specification of Letters Patent.

Patented Apr. 24, 1917.

Application filed September 2, 1916. Serial No. 118,203.

*To all whom it may concern:*

Be it known that I, JACOB W. TRIPP, a citizen of the United States, and resident of New York, in the county of New York and State of New York, have invented certain new and useful Improvements in Rules, of which the following is a specification, reference being had therein to the accompanying drawing.

My present invention relates to a rule attachment having for its object to provide a device whereby any ordinary ruler may be qualified to take outside measurements or measurements of objects whose measured part is at a distance and must be reached by holding the rule out over the same where it would not be easy to aline the end of the ruler with the end of the object without the use of an attachment for assisting in such alinement.

The invention, therefore, consists essentially of a movable sliding attachment for a rule which is pivoted or otherwise attached thereto near the end thereof and which is capable of being moved into a position where a straight edge thereon may be alined with the end of the rule to enable the rule to take measurements as specified; and the invention also comprises numerous details and peculiarities in the construction, arrangement, and combinations of parts, substantially as will be hereinafter described and then more particularly pointed out in the claims.

In the accompanying drawing illustrating my invention:

Similar characters of reference designate corresponding parts throughout the different figures of the drawing.

1 denotes an ordinary graduated rule given here merely by way of example but without any idea of restricting the invention thereto, as the latter is adaptable for any kind of measuring rule, tape, or similar article. The graduations on the rule may be in inches, fractions of inches, or any other subdivisions of linear measurement.

Figure 1:
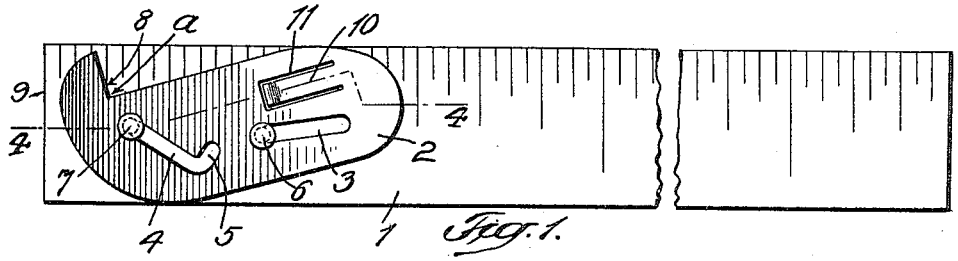
Figure 1 is a plan view of a part of a rule provided with my improved attachment, the latter being shown in its retracted or idle position where it lies on the face of the rule but does not project beyond the edge thereof.
Figure 2:
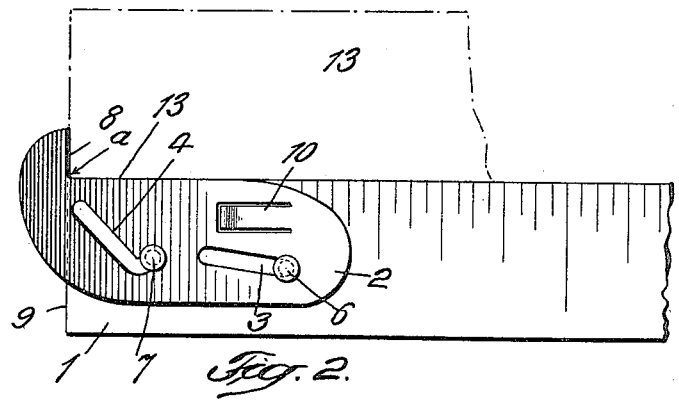
Fig. 2 is a similar view showing the attachment in its operative position when slid beyond the end of the rule so that it may be made capable of performing its function auxiliary to the rule in the taking of outside measurements.

2 denotes my improved attachment which consists primarily of a thin metallic or other plate of proper size to enable it to occupy a position within the boundary lines of the rule 1 when the attachment is not in use, as shown in Fig. 1, but which can easily be slid on the surface of the side of the rule from the idle position of Fig. 1 to the active position of Fig. 2. This plate 2 may have any preferred outline or configuration and is furnished with an angular notch $a$, one edge 8 of which is adapted to aline with the straight end 9 of the rule when the attachment 2 is in its protruding position, as shown in Fig. 2, while the other edge 13 of this angular notch $a$ simultaneously alines itself with the contiguous edge of the rule 1.

Figure 3:
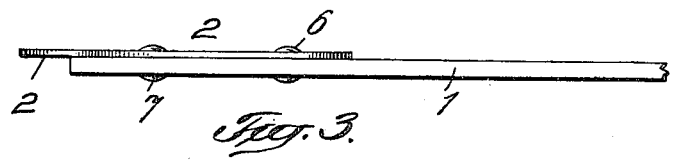
Fig. 3 is an edge view of the device as shown in Fig. 2.
Figure 4:
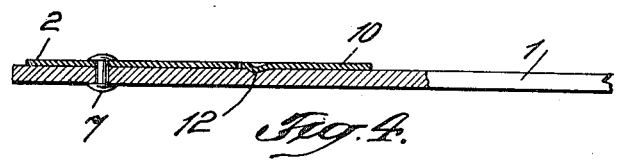
Fig. 4 is a detail sectional view on the line 4, 4 of Fig. 1 and indicates particularly the spring clasp for holding the attachment in its inner position.

Plate 2 is carried on the rule 1 by suitable pivots or other devices which will enable the said plate 2 to assume any position, either its idle or its active position. Of course, the particular pivoting means may vary within wide limits, but a preferred way of carrying the same into effect consists in providing the plate 2 with a slot 4 running usually at an angle with the line 8 in one end of which slot 4 is a right-angled notch 5, while a pivot 7 passes through the slot 4 and its notch 5 and is securely held in the rule 1, said pivot 7 being riveted at both ends as shown in Fig. 3 so that it may hold the plate 2 in position while giving it entire freedom of movement in changing from one position to the other. Also the plate 2 is provided with another slot 3 behind slot 4, through which slot 3 passes another pivot pin 6 that is held in the rule 1 and is provided at both ends with riveted heads to keep the plate 2 in place and yet enable it to have the requisite freedom of movement in changing from one position to another. Also the plate 2 has a cut-out lip or finger 10 bent at or near the end so that it can engage a notch or depression 12 in the surface of the rule 1 when said plate 2 is in its innermost position thereby locking the same temporarily in this position, but holding it with an easy action so that it can be readily opened for use by simply pressing on the inner end of the slide 2 and pushing it from the position of Fig. 1 to the position of Fig. 2.

The operation and use of my device will be clearly understood from the foregoing description. If we assume that 13 denotes an article which it is desired to measure by means of the rule 1 and that the end of the article is so placed, either at a distance or otherwise, that it is impracticable to hold the rule with its end 9 at the end of the article 13, all that the user of the rule needs to do is to slip the slide 2 endwise and sidewise, its course being guided by the slots 3 and 4 and the pins 6 and 7 so that it will shift from the position shown in Fig. 1 into the position shown in Fig. 2 where the edge 8 of the notch $a$ will be alined with the end 9 of rule 1, and this edge 8 by engaging the end of the article 13 will bring the end 9 of the rule 1 exactly opposite to the end of article 13 so that the measurement thereof will be accurate. When the slide 2 is being so extended it will not only be shifted along the slots 3 and 4 but also along the right angle in slot 5 of the slot 4 which will receive the pin 7, as shown in Fig. 2, and will thus temporarily hold the device in its active position. It will be understood, of course, that the angles of the slots 3 and 4 with relation to the angle of the right-angled edges of the notch $a$ must be regulated so that when the device is extended the edge 8 will accurately aline with the edge 9, and also the offset slot 5 must be of such length and position as to enable this alining of the edges 8 and 9 to take place perfectly, but all these adjustments and details can be varied and changed without exceeding the limits of the invention, and I reserve the liberty of making all needful changes in the precise details and relative arrangement of parts as may be required to give the invention the broadest practical application and use.

Having thus described my invention, what I claim as new and desire to secure by Letters Patent, is:

1. The combination with a measuring device, of a slotted slide and means consisting of pins in the measuring device which pass through slots in the slide for movably connecting said slide to the measuring device, said slide having an angular notch, an edge of which accurately alines with the end of the measuring device when the slide is extended.

2. The combination with a measuring device, of a slotted slide, pins in the measuring device which pass through the slots in said slide, so that the slide may be limited in its movements by the pins and may bring one of its edges into projecting alinement with the end of the measuring device.

3. A rule in combination with a slotted slide, pins in the rule passing through the slots in the slide and located so that the slide may be extended beyond the end of the rule and may be caused to project laterally so as to bring an edge in alinement with the end of the rule.

4. The combination with a graduated rule, of a slotted slide having an angular notch in one edge, one of the slots having a right-angled offset slot at one end, pins in the rule and passing through the slots for controlling the movement and position of the slide when extended, in order that one of the edges of the notch may be brought into alinement with the end of the rule and thus provide a hook to engage an object.

5. The combination with a rule, of a slotted slide having an end provided with an angular notch, one of whose edges is designed to be alined with the end of the rule, guiding means on the rule passing through the slots in the slide in order that the position of the latter may be accurately determined, and means for temporarily holding the slide in its idle position.

6. The combination of a rule, and a slotted slide having a hook-shaped end provided with an edge which alines with the end of the rule when the slide is projected, means for pivotally supporting the slide on the rule consisting of pins in the rule passing through the slots in the slide, and a spring detent for holding the slide in its inner position.

In testimony whereof I hereunto affix my signature.

JACOB W. TRIPP.

Copies of this patent may be obtained for five cents each, by addressing the "Commissioner of Patents, Washington, D. C."